UNITED STATES PATENT OFFICE.

NICHOLAS BELFIELD DENNYS, OF LONDON, ENGLAND.

ANTI-FOULING PAINT.

SPECIFICATION forming part of Letters Patent No. 444,665, dated January 13, 1891.

Application filed November 14, 1889. Serial No. 330,332. (No specimens.) Patented in England February 17, 1890, No. 2,539.

*To all whom it may concern:*

Be it known that I, NICHOLAS BELFIELD DENNYS, a subject of the Queen of Great Britain, residing at London, in the county of Middlesex, England, have invented certain new and useful Improvements in Anti-fouling Paints for Ships' Bottoms or other Submerged Surfaces of Iron or other Metal or Wood, (which has been patented in Great Britain February 17, 1890, No. 2,539;) and I do hereby declare the following to be a full, clear, and exact description of the invention, such as will enable others skilled in the art to which it appertains to make and use the same.

My composition of matter to be used as an anti-fouling paint for ships' bottoms or other submerged surfaces of iron or other metal or wood consists of the following ingredients combined, substantially in the proportions stated: Thus I first take sulphate of zinc in powder, twenty-four parts, by measure; sulphate of mercury in powder, two parts by measure; oxide of iron in powder, six parts, by measure; oxide of copper in powder, eighty-one parts, by measure; zinc slag finely pulverized, twenty-nine parts, by measure; metallic zinc in fine powder, seventy parts, by measure. These several ingredients are to be thoroughly mixed, and I then take or make a second mixture composed of the following ingredients: Solution of tannin, forty parts; shellac varnish, weighing about nine pounds four ounces to the gallon, two hundred and forty-four parts, and thoroughly mix the same. The ingredients of the first mixture—that is, the sulphate of zinc, sulphate of mercury, oxide of iron, oxide of copper, zinc slag, and metallic zinc, all mixed together and in powder form, as described—are then introduced to and stirred up in the second mixture of solution of tannin and shellac varnish until the whole mass assumes the consistency of ordinary paint.

If desired, this my improved anti-fouling paint or composition may be thinned or have added to it additional varnish or methylated spirits when the mixture is found to thicken, as caused, for instance, by a fall in temperature, prolonged exposure to the air, or long-continued storage.

In using my improved paint the same should be applied over a hard dry coating or priming, preferably a preparation of red lead or of an oxide of iron; or it may be applied over many of the preparations now in use as priming coatings, it only being essential that the under coating or priming be hard and dry before applying my improved paint, which acts as an effectual anti-fouler, does not eat away the surface of iron or steel applied to the bottoms of steamers, and is exceedingly durable.

Having thus described my invention, what I claim as new, and desire to secure by Letters Patent, is—

The herein-described composition of matter to be used as an anti-fouling paint for ships' bottoms and other submerged surfaces, consisting of sulphate of zinc, sulphate of mercury, oxide of iron, oxide of copper, zinc slag, metallic zinc, solution of tannin, and shellac varnish, substantially in or about the proportions and prepared or mixed as specified.

In testimony whereof I affix my signature in presence of two witnesses.

NICHOLAS BELFIELD DENNYS.

Witnesses:
   JNO. C. NEW,
      *Consul General.*
   OLIVER R. JOHNSON,
*Consulate General U. S. A. at London, England.*